(12) United States Patent
Lai

(10) Patent No.: US 10,048,774 B2
(45) Date of Patent: Aug. 14, 2018

(54) MOUSE DEVICE WITH STRUCTURE FOR ADJUSTING LOAD OF A PRESS-BUTTON

(71) Applicants: DEXIN ELECTRONIC LTD., Donggaun Guangdong (CN); DEXIN CORPORATION, New Taipei (TW)

(72) Inventor: Yen-Yao Lai, New Taipei (TW)

(73) Assignees: DEXIN ELECTRONICS LTD., Dongguan, Gunagdong (CN); DEXIN CORPORATION, New Taipei (TW)

( * ) Notice: Subject to any disclaimer, the term of this patent is extended or adjusted under 35 U.S.C. 154(b) by 151 days.

(21) Appl. No.: 15/331,781

(22) Filed: Oct. 21, 2016

(65) Prior Publication Data

US 2018/0113521 A1   Apr. 26, 2018

(51) Int. Cl.
*G06F 3/0354* (2013.01)

(52) U.S. Cl.
CPC .................. *G06F 3/03543* (2013.01)

(58) Field of Classification Search
CPC ............ G06F 3/03543; G06F 3/03544; G06F 3/03541; G06F 3/0354; G06F 3/0346; G06F 3/0312; G06F 3/0317; G06F 3/0362; G06F 3/033; G06F 3/0202; G06F 2203/0332–2203/0337; H01H 13/85; H01H 2207/034; H03K 2217/96062
See application file for complete search history.

(56) References Cited

U.S. PATENT DOCUMENTS

2011/0279371 A1* 11/2011 Ma ...................... G06F 3/03543
                                                                    345/163

* cited by examiner

*Primary Examiner* — Kumar Patel
*Assistant Examiner* — Amen Bogale
(74) *Attorney, Agent, or Firm* — Li & Cai Intellectual Property (USA) Office

(57) ABSTRACT

A mouse device includes a main body, a press-button, a sliding button movably disposed on the main body, an adjusting member connected to the sliding button, an elastic element disposed on the adjusting member, a loading seat and an arm-swing seat disposed in the main body. The main body has a receiving space and a switch module disposed therein. The press-button has a trigger portion. The loading seat has a first surface and a second surface on a bottom thereof with different level heights. The arm-swing seat has a swing arm disposed between the trigger portion and the switch module. The switch module is triggered by the trigger portion and the arm-swing seat. The elastic element is synchronously moved with the sliding button and has an abutting portion selectively abutted against the first surface or the second surface to provide different loads for the press-button.

10 Claims, 5 Drawing Sheets

MOUSE DEVICE WITH STRUCTURE FOR ADJUSTING LOAD OF A PRESS-BUTTON

BACKGROUND OF THE INVENTION

1. Field of the Invention

The present invention is related to a computer mouse. In particular, the present disclosure relates to a computer mouse device with a structure for adjusting load of a press-button.

2. Description of Related Art

The most common inputting devices for current computer devices are keyboards and a computer mouse. A computer mouse usually has at least two press-buttons at the left and right side respectively, and a roller button between the two press-buttons. There are many popular playing games, which are popularized by social media. Skilled game players usually make public the instant game condition on a website in a directly broadcast manner, so as to build popularity. Some players even have professional control skills or game tactics, and choose game-playing as a career, as a cyber-sports player. The computer games have become a competition. The computer mouse usually is clicked over thousand times in one game. However, the current computer mouse only provides a fixed tactile feel of the press-button, and cannot provide a different tactile load feel for the press-button according to different requirements of a user, which unavoidably causes inconvenience.

To address the above issues, the inventor strives via associated experience and research to present the instant disclosure, which can effectively improve the limitation described above.

SUMMARY OF THE INVENTION

It is one objective of this invention to provide a mouse device with a structure for adjusting load of a press-button, and a user can adjust the different loads of the tactile feel of a press-button according to personal requirements.

In order to achieve the above objectives, the instant disclosure provides a mouse device with a structure for adjusting load of a press-button, which includes a main body, a press-button, a sliding button, an adjusting member, an elastic element, a loading seat and an arm-swing seat. The main body has a receiving space formed therein for receiving a switch module. The press-button is disposed on the main body in a swingable manner. The press-button has a trigger portion formed at an inner side thereof. The trigger portion is disposed above the switch module. The sliding button is movably disposed on the main body, and is exposed to an outside of the main body. The adjusting member is disposed in the receiving space of the main body. The adjusting member is connected to the sliding button. The elastic element is disposed on the adjusting member and has an abutting portion. The loading seat is disposed in the receiving space of the main body. The loading seat is disposed above the elastic element, and has a first surface and a second surface formed on a bottom thereof. The first surface and the second surface are located at different level heights. The arm-swing seat is swingably disposed in the receiving space of the main body. The arm-swing seat is disposed above the loading seat. The arm-swing seat has a swing arm, which is disposed between the trigger portion of the press-button and the switch module. When the press-button is pressed, the switch module is triggered by the trigger portion and the swing arm of the arm-swing seat. The elastic element is movably moved with the sliding button and the adjusting member synchronously. The abutting portion of the elastic element is selectively corresponded to the first surface and the second surface of the loading seat, so as to provide a different load for the press-button.

Thus, the instant disclosure has advantages as follows.

The instant disclosure has a sliding button which is movable for adjustment, and is connected to the adjusting member and the elastic element. The abutting portion of the elastic element is corresponding to the first surface or the second surface of the loading seat. Because the first surface and the second surface of the loading seat are disposed at different level heights, a force from the elastic element exerted on the loading seat is different. Thus, an interference of the elastic element is used to control the load of the press-button to be lighter or heavier. In addition, a resistant-force point is defined where the abutting portion of the elastic element is abutted against the loading seat. An effort-force point is defined where the swing arm contacts with the trigger portion of the press-button. When a distance between the resistant-force point and the effort-force point is changed, the load of the press-button can be heavier or lighter. Thus, the present disclosure provides the mouse device with a structure for adjusting load of a press-button, and a user can adjust the load tactile feel of the press-button according to personal requirements, so that the press-button of the computer mouse device has a different load of tactile feel.

For further understanding of the instant disclosure, reference is made to the following detailed description illustrating the embodiments and examples of the instant disclosure. The description is for illustrative purpose only and is not intended to limit the scope of the claim.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
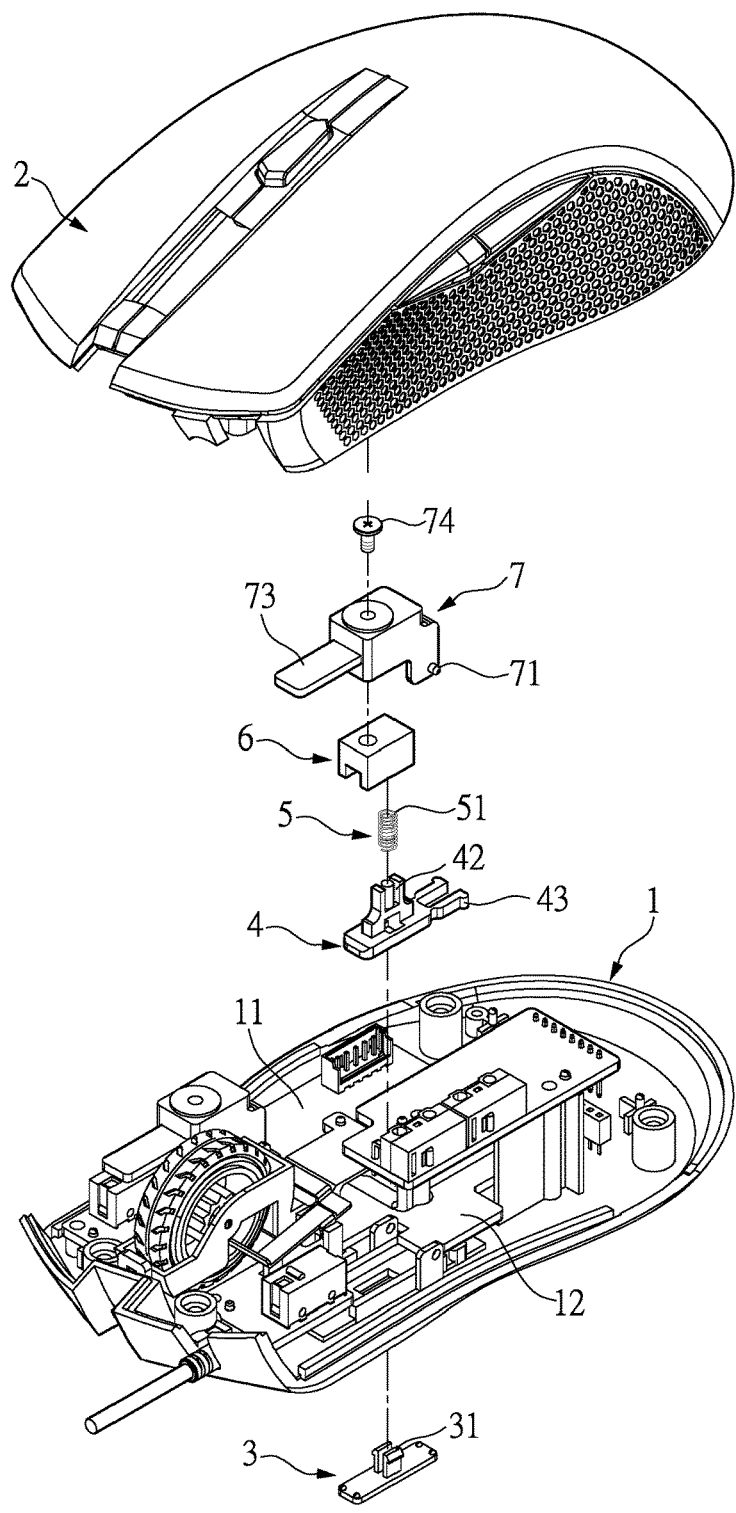
FIG. 1 is an exploded perspective view of a mouse device of the instant disclosure.
Figure 2:
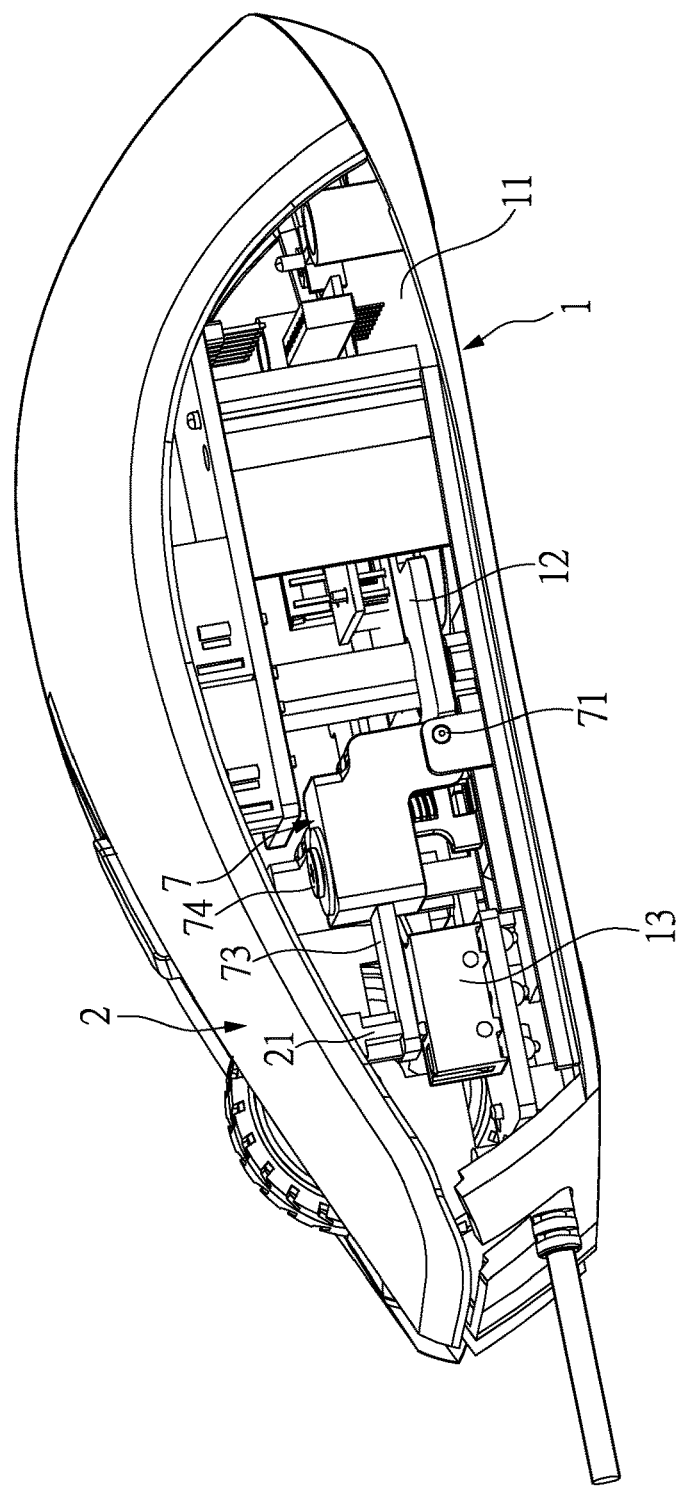
FIG. 2 is a perspective view of an inner configuration of the mouse device of the instant disclosure.

Please refer to FIG. 1 and FIG. 2. The instant disclosure provides a mouse device with a structure for adjusting load of a press-button, which includes a main body 1, a press-button 2, a sliding button 3, an adjusting member 4, an elastic element 5, a loading seat 6 and an arm-swing seat 7.

The main body 1 is formed with a receiving space 11 therein. A circuit board 12 and a switch module 13 are received in the receiving space 11. The switch module 13 is electrically connected to the circuit board 12. The receiving space 11 means a space formed in an inner part of the main body 1, which be configured with the elements common to a computer mouse, such as an optical reader module and a roller . . . etc. Such elements are not emphasized in this present disclosure, and not described further.

The press-button 2 is disposed on the main body 1 and is swingable upward or downward. The press-button 2 has a trigger portion 21 disposed on an inner side thereof. The trigger portion 21 is arranged above the switch module 13. When the press-button 2 is pressed, the trigger portion 21 can trigger the switch module 13. A computer mouse device usually has two sets of press-buttons 2 at the left and right sides respectively, and correspondingly, there are two sets of the sliding button 3, the adjusting member 4, the elastic element 5, the loading seat 6 and the arm-swing seat 7. Since the structure of the two sets are similar, only one set is illustrated, but the set number is not limited thereto.

Figure 4:
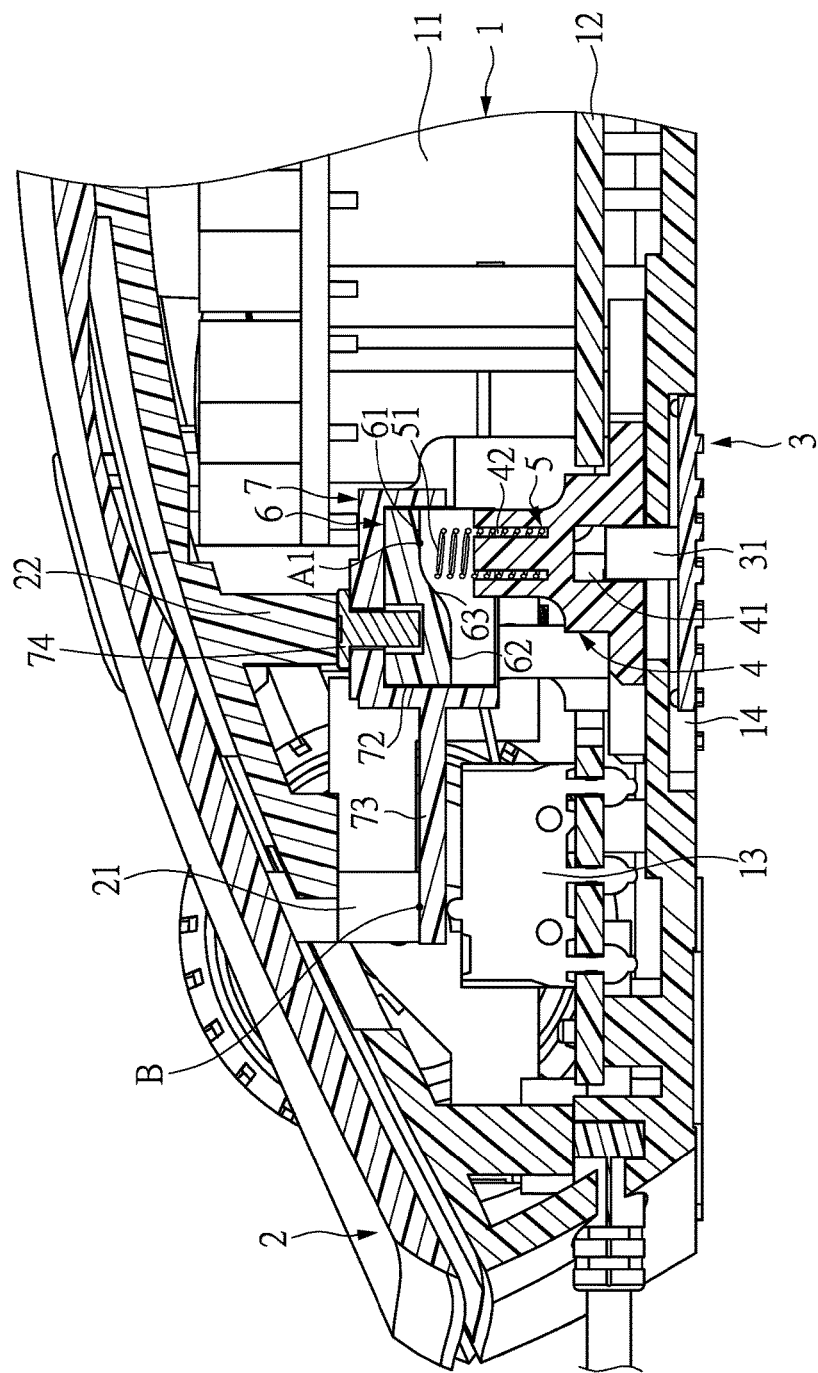
FIG. 4 is a cross-sectional view of the mouse device having a press-button with a lighter load of the instant disclosure.
Figure 5:
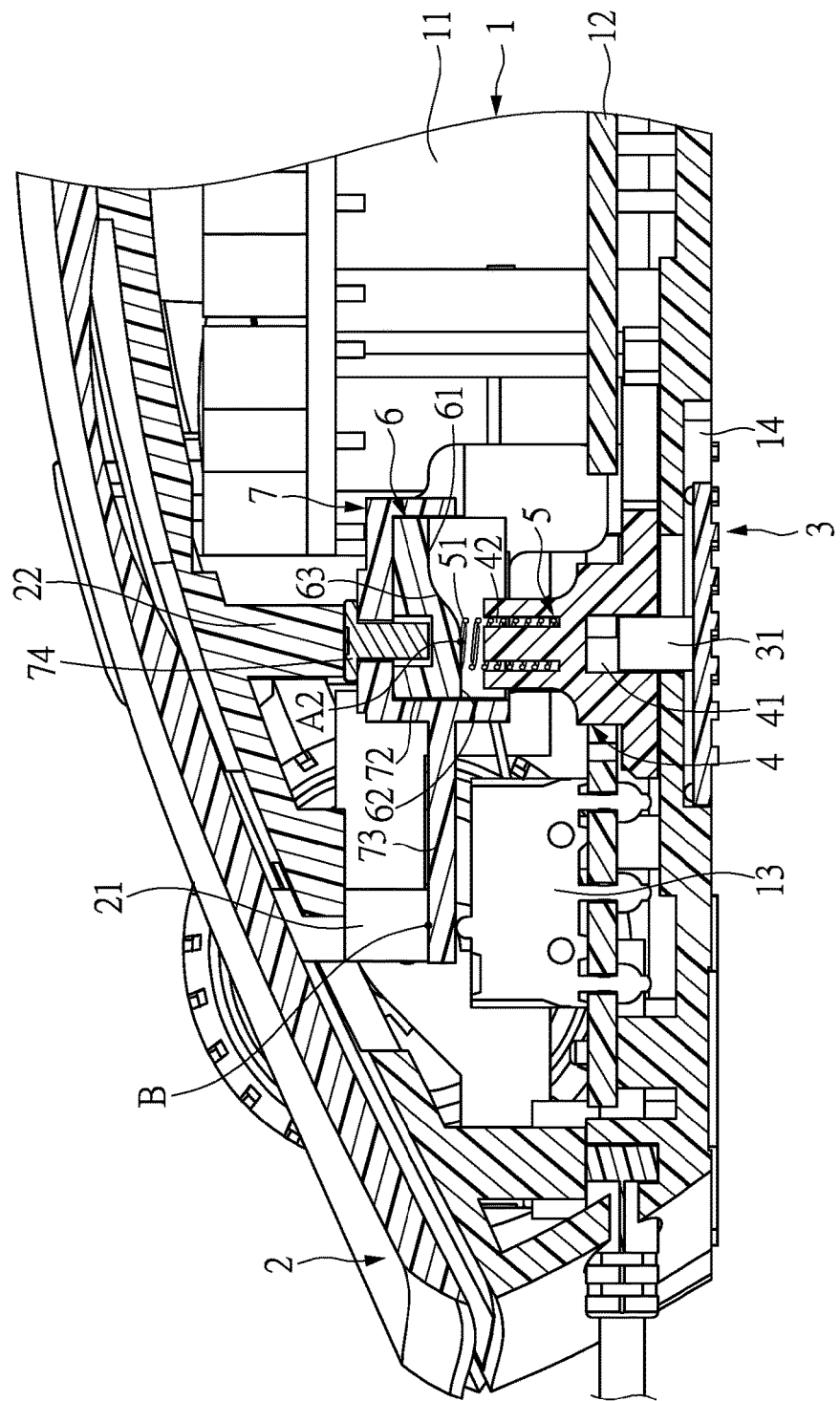
FIG. 5 a cross-sectional view of the mouse device having a press-button with a heavier load of the instant disclosure.

The sliding button 3 is movably disposed on the main body 1, as shown in FIG. 4 and FIG. 5. The sliding button 3 is exposed to an outside of the main body 1, so that a user can push the sliding button 3 to adjust a load of the press-button 2. In this embodiment, the sliding button 3 is disposed on a bottom of the main body 1. The sliding button 3 is disposed in a sliding slot 14 formed at the bottom of the main body 1, so that the sliding button 3 can move forward or rearward for adjustment.

Figure 3:
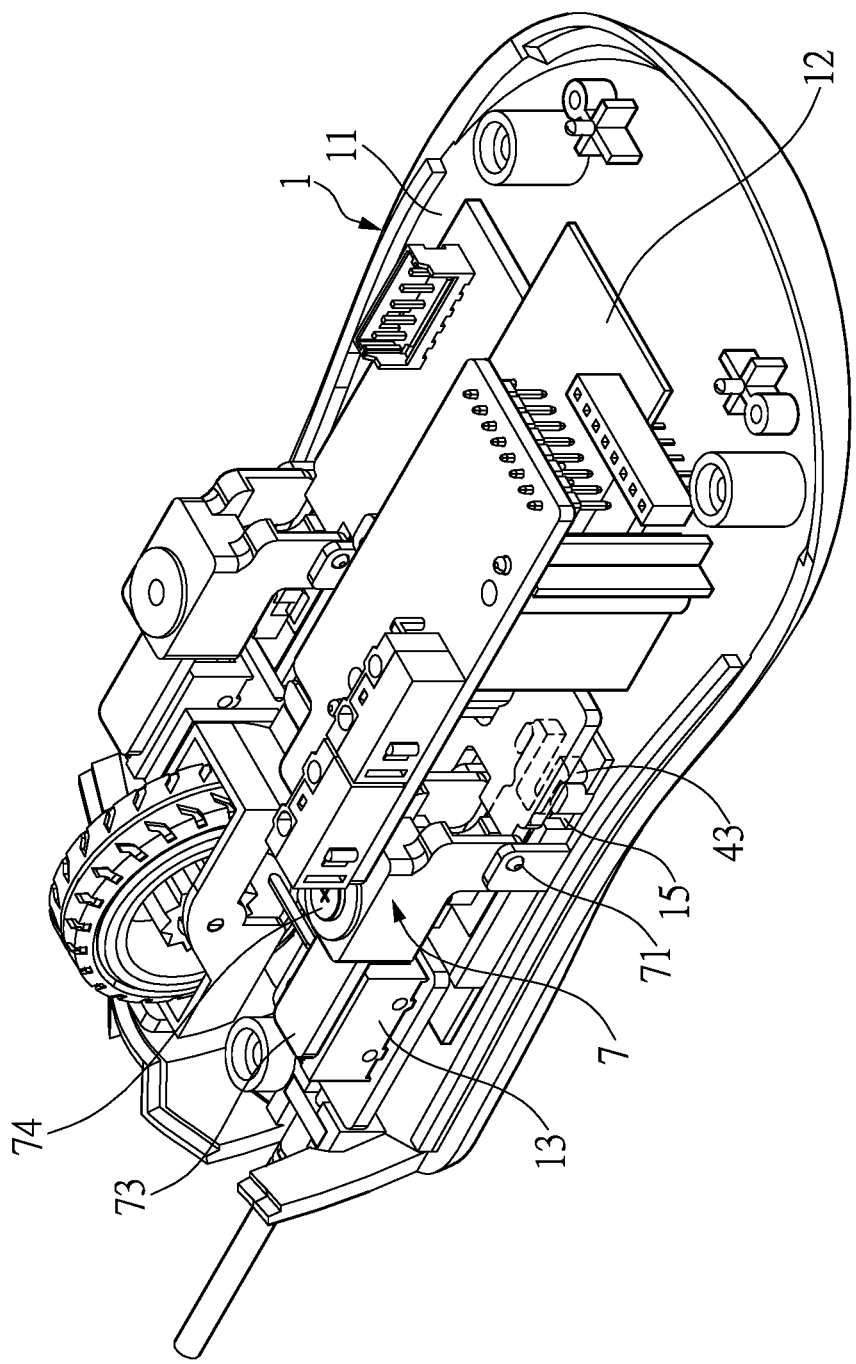
FIG. 3 is a partial perspective view of the mouse device of the instant disclosure.

The adjusting member 4 is received in the receiving space 11 of the main body 1. The adjusting member 4 is connected to the sliding button 3, so that the adjusting member 4 and sliding button 3 can be moved synchronously. The connecting way of the adjusting member 4 and the sliding button 3 is not limited in this present disclosure. In this embodiment, a top portion of the sliding button 3 is formed with a protruding hook 31, and a bottom portion of the adjusting member 4 is formed with an engaging hole 41. The protruding hook 31 is engaged in the engaging hole 41. The adjusting member 4 is formed with a retaining slot 42 on a top portion thereof, which is used to retain the elastic element 5. The adjusting member 4 has a positioning hook 43 protruded from a rear end thereof, and the main body 1 has a positioning slot 15 formed on an inner part thereof, as shown in FIG. 3. When the adjusting member 4 is moved forward, the positioning hook 43 can be fixed at a predetermined position by engaging in the positioning slot 15, so as to avoid an unexpected movement of the sliding button 3 and the adjusting member 4.

The elastic element 5 can be a compression spring or a leaf spring . . . etc. and is not limited thereto. In this embodiment, the elastic element 5 is a compression spring, and the elastic element 5 is disposed on the adjusting member 4. In other words, the elastic element 5 is received in the retaining slot 42. The elastic element 5 has an abutting portion 51, and the abutting portion 51 is formed on one end of the elastic element 5 away from the adjusting member 4. The abutting portion 51 of the elastic element 5 is protruded from the adjusting member 4. The elastic element 5 is disposed on the adjusting member 4, so that the elastic element 5 can move simultaneously with the sliding button 3 and the adjusting member 4.

The loading seat 6 is disposed in the receiving space 11 of the main body 1, and the loading seat 6 is disposed above the elastic element 5. The loading seat 6 has a bottom portion which is formed with a first surface 61 and a second surface 62. The first surface 61 and the second surface 62 are formed at different level heights. For example, the level height of the first surface 61 is higher than the level height of the second surface 62. A connecting slope 63 is formed between the first surface 61 and the second surface 62. Two ends of the connecting slope 63 are respectively connected to the first surface 61 and the second surface 62. The elastic element 5 can synchronously move with the sliding button 3 and the adjusting member 4, so that the abutting portion 51 of the elastic element 5 is selectively abutted against the first surface 61 or the second surface 62. The abutting portion 51 of the elastic element 5 can be smoothly guided by the connecting slope 63 toward the first surface 61 or the second surface 62.

The arm-swing seat 7 is swingably disposed in the receiving space 11 of the main body 1. The arm-swing seat 7 is disposed on the loading seat 6. In this embodiment, the arm-swing seat 7 has a pivoting portion 71. The pivoting portion 71 is pivotally connected in an inner portion of the main body 1, so that the arm-swing seat 7 is swingably disposed in the main body 1. The arm-swing seat 7 has an accommodating port 72 on a bottom portion thereof. The loading seat 6 is disposed in the accommodating port 72, and the arm-swing seat 7 and loading seat 6 are jointed as one member. The arm-swing seat 7 has a swing arm 73. The swing arm 73 is disposed on one end of the arm-swing seat 7 away from the pivoting portion 71. The swing arm 73 is an arm extended in a horizontal direction. The swing arm 73 is disposed between the trigger portion 21 of the press-button 2 and the switch module 13. The second surface 62 of the loading seat 6 is arranged between the first surface 61 and the swing arm 73. In other words, the second surface 62 is closer to the swing arm 73 than the first surface 61. When the press-button 2 is pressed, the switch module 13 is triggered by the trigger portion 21 and the swing arm 73 of the arm-swing seat 7.

Moreover, the arm-swing seat 7 has an adjusting screw 74 screwed thereon. The adjusting screw 74 has an end extended into the accommodating port 72, and the adjusting screw 74 is abutted against the loading seat 6. Thus, by the rotation of the adjusting screw 74, the level height of the loading seat 6 can be adjusted, so that the loading seat 6 is adjustable, and the load of the press-button 2 can be further adjusted. The press-button 2 has a restricting member 22 disposed at an inner side thereof. The restricting member 22 is disposed above the adjusting screw 74 or the arm-swing seat 7 to provide a position restriction effect for the arm-swing seat 7 swinging upward.

Please refer to FIG. 4, when the sliding button 3 moves rearward, the adjusting member 4 and the elastic element 5 are simultaneously moved rearward. The abutting portion 51 of the elastic element 5 is corresponding to the first surface 61 and the loading seat 6. The first surface 61 of the loading seat 6 is located at a higher level height, so that a force from the elastic element 5 exerted on the loading seat 6 is smaller or none. Thus, the present disclosure utilizes an interference of the elastic element 5 to control the load of the press-button 2 to be lighter. Besides, a resistant-force point A1 is defined on where the abutting portion 51 of the elastic element 5 is abutted against the loading seat 6. An effort-force point B is defined on where the swing arm 73 contacts with the trigger portion 21 of the press-button 2. When a distance between the resistant-force point A1 and the effort-force point B becomes larger, the load of the press-button 2 can be lighter.

Please refer to FIG. 5. When the sliding button 3 moves forward, the adjusting member 4 and the elastic element 5 are simultaneously moved forward. The abutting portion 51 of the elastic element 5 is corresponding to the second surface 62 and the loading seat 6. The second surface 62 of the loading seat 6 is located at a lower level height, so that a force from the elastic element 5 exerted on the loading seat 6 is increased. Thus, the present disclosure utilizes an interference of the elastic element 5 to control the load of the press-button 2 to be heavier. In addition, a resistant-force point A2 is defined on where the abutting portion 51 of the elastic element 5 is abutted against the loading seat 6. An effort-force point B is defined on where the swing arm 73 contacts with the trigger portion 21 of the press-button 2. When a distance between the resistant-force point A2 and the effort-force point B becomes shorter, the load of the press-button 2 can be heavier.

To sum up, the present disclosure provides the mouse device with a structure for adjusting the load of a press-button. A user can adjust the load tactile feel of the press-button according to a personal requirement, so that the press-button of the computer mouse device has different loads of tactile feel.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A mouse device with a structure for adjusting load of a press-button, comprising:
   a main body, having a receiving space formed therein, the receiving space having a switch module;
   a press-button, disposed on the main body in a swingable manner, wherein the press-button has a trigger portion formed at an inner side thereof, the trigger portion is disposed above the switch module;
   a sliding button, being movably disposed on the main body, and the sliding button being exposed to an outside of the main body;
   an adjusting member, disposed in the receiving space of the main body, the adjusting member connected to the sliding button;
   an elastic element, disposed on the adjusting member, the elastic element having an abutting portion;
   a loading seat, disposed in the receiving space of the main body, wherein the loading seat is disposed above the elastic element, a bottom part of the loading seat has a first surface and a second surface, the first surface and the second surface are formed at different level height; and
   an arm-swing seat, disposed in the receiving space of the main body in a swingable manner, wherein the arm-swing seat is disposed above the loading seat, the arm-swing seat has a swing arm between the trigger portion of the press-button and the switch module, when the press-button is pressed, the switch module is triggered by the trigger portion and the swing arm of the arm-swing seat;
   wherein the elastic element is movable with the sliding button and the adjusting member synchronously, the abutting portion of the elastic element is selectively corresponded to the first surface or the second surface of the loading seat, so as to provide different loads for the press-button.

2. The mouse device with a structure for adjusting load of a press-button as claimed in claim 1, wherein the main body has a sliding slot formed on a bottom thereof, the sliding button is disposed in the sliding slot, wherein the adjusting member is formed with a positioning hook, the main body has a positioning slot formed therein, the positioning hook is hooked with the positioning slot and is stopped as a predetermined position so as to limit a forward movement of the adjusting member.

3. The mouse device with a structure for adjusting load of a press-button as claimed in claim 1, wherein the sliding button has a protruding hook formed at a top thereof, the adjusting member has an engaging hole formed at a bottom thereof, the protruding hook is engaged in the engaging hole.

4. The mouse device with a structure for adjusting load of a press-button as claimed in claim 1, wherein the adjusting member is formed with a retaining slot, and the elastic element is a compression spring, the elastic element is received in the retaining slot, wherein the abutting portion is formed on an end of the elastic element far away from the adjusting member, the abutting portion is protruded from the adjusting member.

5. The mouse device with a structure for adjusting load of a press-button as claimed in claim 1, wherein a level height of the first surface is higher than a level height of the second surface.

6. The mouse device with a structure for adjusting load of a press-button as claimed in claim 5, wherein the second surface of the loading seat is arranged between the first surface and the swing arm.

7. The mouse device with a structure for adjusting load of a press-button as claimed in claim 1, wherein a connecting slope is formed between the first surface and the second surface, two ends of the connecting slope are respectively connected to the first surface and the second surface.

8. The mouse device with a structure for adjusting load of a press-button as claimed in claim 1, wherein the arm-swing seat has a pivoting portion, the pivoting portion is pivotally connected to an inner part of the main body, and the swing arm is disposed on an end of the arm-swing seat far away from the pivoting portion.

9. The mouse device with a structure for adjusting load of press-button as claimed in claim 1, wherein the arm-swing seat has an accommodating port formed on a bottom thereof, the loading seat is disposed in the accommodating port, the arm-swing seat has an adjusting screw, the adjusting screw has one end extended into the accommodating port, and the adjusting screw is abutted against the loading seat.

10. The mouse device with a structure for adjusting load of a press-button as claimed in claim 1, wherein the press-button has a restricting member disposed on an inner side thereof, the restricting member is disposed above the adjusting screw or the arm-swing seat to provide a position restriction effect for the arm-swing seat.

* * * * *